(12) United States Patent
Lambricht et al.

(10) Patent No.: US 12,344,551 B2
(45) Date of Patent: *Jul. 1, 2025

(54) METHOD FOR MANUFACTURING A PARTIALLY TEXTURED GLASS ARTICLE

(71) Applicant: AGC GLASS EUROPE, Louvain-la-Neuve (BE)

(72) Inventors: Thomas Lambricht, Perwez (BE); Sébastien Caliaro, Morialme (BE); Sylvain Drugman, Morlanwelz (BE); Loïck Dogot, Gosselies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 702 days.

This patent is subject to a terminal disclaimer.

(21) Appl. No.: 17/431,512

(22) PCT Filed: Feb. 19, 2020

(86) PCT No.: PCT/EP2020/054309
§ 371 (c)(1),
(2) Date: Aug. 17, 2021

(87) PCT Pub. No.: WO2020/169644
PCT Pub. Date: Aug. 27, 2020

(65) Prior Publication Data
US 2022/0048814 A1 Feb. 17, 2022

(30) Foreign Application Priority Data
Feb. 20, 2019 (EP) .................................. 19158334

(51) Int. Cl.
*C03C 23/00* (2006.01)
*B23K 26/40* (2014.01)
(Continued)

(52) U.S. Cl.
CPC .......... *C03C 23/0025* (2013.01); *B23K 26/40* (2013.01); *B23K 26/53* (2015.10);
(Continued)

(58) Field of Classification Search
CPC .... C03C 15/00; C03C 21/002; C03B 33/0222
See application file for complete search history.

(56) References Cited

U.S. PATENT DOCUMENTS

2012/0135195 A1 5/2012 Glaesemann et al.
2013/0260105 A1 10/2013 Lee et al.
(Continued)

FOREIGN PATENT DOCUMENTS

GB          2323333 A   *  9/1998  ............. B44C 1/221
JP     2017128493 A   *  7/2017  ......... B23K 26/0006

OTHER PUBLICATIONS

JP 2017-128493 A (Ito) Jul. 27, 2017 (English language machine translation). [online] [retrieved Apr. 5, 2024]. Retrieved from: Espacenet. (Year: 2017).*
(Continued)

*Primary Examiner* — Erin Snelting
(74) *Attorney, Agent, or Firm* — Oblon, McClelland, Maier & Neustadt, L.L.P.

(57) ABSTRACT

A method of manufacturing a partially textured glass article that includes (a) providing partially textured mother glass substrate that includes a first main surface and a second main surface which are opposed to each other; (b) irradiating the first main surface of the glass substrate with a laser to form a separating line on the first main surface that defines contour lines and extends from the first main surface to the second main surface dividing the glass article from the glass substrate, the glass article being a size smaller than the mother glass substrate; and (c) separating the partially textured glass article is separated from the mother glass
(Continued)

Figure 1:
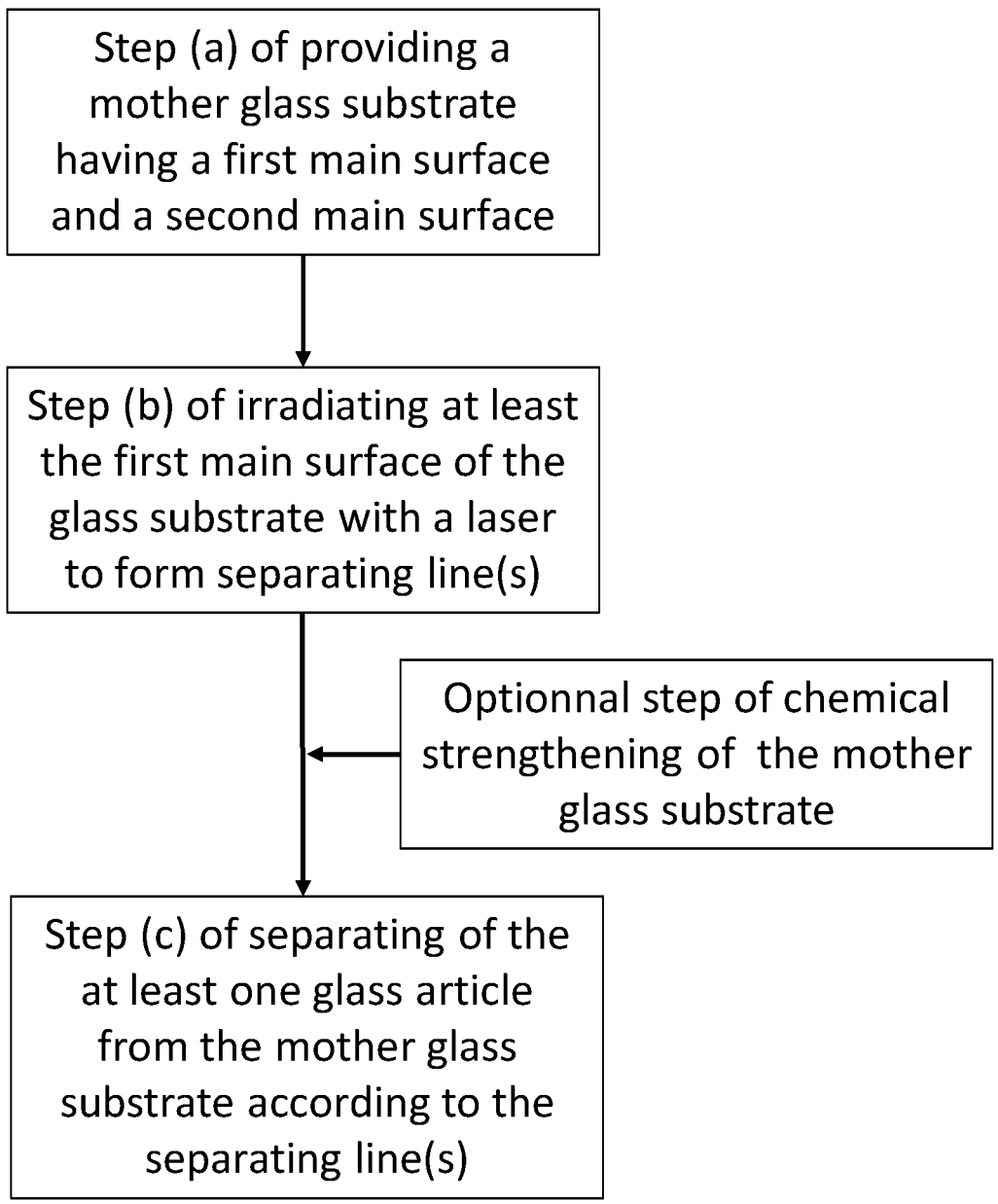

substrate by the separating line. The method allows cutting a large partially textured mother glass substrate, with high precision, into smaller articles of partially textured glass at a requested size.

13 Claims, 2 Drawing Sheets

(51) Int. Cl.
    *B23K 26/53*     (2014.01)
    *C03B 33/02*     (2006.01)
    *C03C 21/00*     (2006.01)
    *B23K 101/00*     (2006.01)
    *B23K 103/00*     (2006.01)

(52) U.S. Cl.
    CPC ........ *C03B 33/0222* (2013.01); *C03C 21/002* (2013.01); *B23K 2101/006* (2018.08); *B23K 2103/54* (2018.08); *C03C 2203/52* (2013.01)

(56) References Cited

U.S. PATENT DOCUMENTS

| | | | |
|---|---|---|---|
| 2013/0295333 A1* | 11/2013 | Kim | C03B 33/02 65/61 |
| 2014/0340730 A1 | 11/2014 | Bergh et al. | |
| 2015/0083468 A1* | 3/2015 | Domercq | H05K 1/0306 174/255 |
| 2015/0165560 A1 | 6/2015 | Hackert et al. | |
| 2015/0174625 A1* | 6/2015 | Hart | G06F 3/041 428/141 |
| 2016/0368809 A1 | 12/2016 | Hackert et al. | |
| 2017/0002601 A1 | 1/2017 | Bergh et al. | |
| 2017/0305780 A9 | 10/2017 | Zhang et al. | |
| 2018/0105451 A1 | 4/2018 | Wieland | |
| 2018/0186680 A1 | 7/2018 | Nagasawa et al. | |
| 2019/0219882 A1 | 7/2019 | Bergh et al. | |

OTHER PUBLICATIONS

International Search Report issued Apr. 21, 2020 in PCT/EP2020/054309 filed Feb. 19, 2020, 4 pages.

* cited by examiner

METHOD FOR MANUFACTURING A PARTIALLY TEXTURED GLASS ARTICLE

1. FIELD OF THE INVENTION

The present invention relates to a method for manufacturing a partially textured glass article. More particularly, the present invention relates to an improved method for manufacturing pieces of partially textured glass at a requested size from a larger partially textured mother glass substrate.

2. BACKGROUND ART

In the fields of cover glass for electronic equipment, glazing for building materials and glazing for vehicles, there is a need for pieces of glass sheets with specific sizes (sometimes small sizes) and showing a specific roughness/texture only on some parts if their main surface, i.e. in the form of several features/patterns/zones. For example, partially textured small glass pieces may be used as protective/cover glass, viewing window or (touch)screen for numerous electronic devices like mobile phones, smartphones, TV, computers, digital cameras, etc. They may also be used as interior glazing for automotive, like a trim element or a console.

If the textured features/zones are repeatedly created, using any method known, on a large mother glass substrate (i.e. up to a PLF or DLF size), then the sheet needs to be cut in thickness at a later stage in order to get smaller pieces with the textured features. However, the targeted applications for such partially textured glass pieces require very high precision in the position of the textured features/zones on each glass piece manufactured. Unfortunately, the commonly used methods for cutting glass in thickness, especially cutting a large sheet into several small pieces, show an accuracy which is too low (in the order of 0.2 to 2 mm). These methods are for example those using a cutting wheel with a sharp circumference edge, using a water jet, or using a saw.

Another solution to manufacture small pieces of partially textured glass could be to firstly cut the large mother glass substrate into smaller pieces of appropriate final size and, secondly, to create a given textured pattern/zone on each of the small pieces. However, such a solution is absolutely not economically viable because of handling, time-consuming, etc.

Therefore, there is a need for the applications cited above to have available a method for high-precision cutting of a large mother glass substrate bearing repetitive textured patterns/zones into smaller pieces, that allows ensuring the accurate positioning of said patterns/zones on each individual element.

Moreover, the targeted applications (displays, car interior, etc) generally requires the final small glass pieces to be reinforced to address safety requirements, for example through a chemical strengthening treatment. Indeed, the glass used is such applications is mechanically solicited a lot and it is therefore highly desirable that it is able to tolerate damage, such as scratches or impact, during use and transport.

The chemical strengthening treatment is a heat-induced ion-exchange, involving replacement of smaller alkali ions, i.e. sodium or lithium, in the surface layer of glass by larger ions, for example alkali potassium ions. Increased surface compression stress occurs in the glass as the larger ions "wedge" into the small sites formerly occupied by the sodium ions, thereby improving the strength of the glass substrate. Such a chemical treatment is generally carried out by immerging the glass in an ion-exchange molten bath containing one or more molten salt(s) of the larger ions, with a precise control of temperature and time.

Therefore, it would also be very useful if the sought high-precision cutting method would also be appropriate to include a glass reinforcement treatment before the mother substrate is divided into smaller pieces (especially a chemically strengthening treatment).

Commonly, chemically strengthened glass pieces are obtained from a large mother glass substrate by (i) cutting and collecting a plurality of glass pieces with a required size from the mother glass substrate and (ii) chemically strengthening each of the glass pieces. In this conventional method, small glass pieces with low mechanical resistance and prone to scratches are handled before they are submitted to chemically strengthening at a later stage. To avoid this issue, some methods have been developed such as strengthening the larger mother glass before cutting step. However, with such as method, the end faces/edges of the smaller glass pieces have not undergone strengthening (as it would be the case if treated individually after cutting). Consequently, the final glass pieces are not very mechanically resistant at their edges and may not fulfill safety requirements.

3. OBJECTIVES OF THE INVENTION

The present invention has notably the objective of overcoming the cited drawbacks of existing methods.

More particularly, an objective of the present invention is to provide a method of manufacturing pieces of partially textured glass at a requested size from a larger partially textured mother glass substrate. Especially, an objective of the present invention is to provide a high-precision method of manufacturing pieces of partially textured glass at a requested size from a larger mother glass substrate bearing repeated textured patterns/zones.

Another objective to provide a method of manufacturing pieces of partially textured glass at a requested size from a larger partially textured mother glass substrate, that is appropriate to provide a glass reinforcement treatment before the mother glass substrate is divided into the smaller pieces.

Another objective of the present invention is to provide a method of manufacturing pieces of partially textured glass at a requested size from a larger partially textured mother glass substrate, which is simple, efficient and less expensive.

4. DESCRIPTION OF THE INVENTION

The present invention relates to a method of manufacturing at least a partially textured glass article comprising the steps of, in order:

a) providing a partially textured mother glass substrate having a first main surface and a second main surface which are opposed to each other, b) irradiating at least the first main surface of the glass substrate with a laser to form, on the first main surface, at least one separating line defining contour lines and extending in a depth direction from the first main surface to the second main surface, for dividing at least one glass article from the glass substrate, the glass article having a size smaller than the size of the mother glass substrate, and c) separating the at least one partially textured glass article from the mother glass substrate according to the at least one separating line.

Hence, the invention lies on a novel and inventive approach since it enables to find a solution for the disadvantages of prior art. The inventors have indeed found that using such a method allows cutting with a high precision a larger partially textured mother glass substrate bearing repeated patterns into smaller pieces/articles of partially textured glass at a requested size. In particular, the proposed method allows to reach a very good relative positioning of the cutting line(s) with respect to the textured features, ensuring the right location of said features on the smaller cut glass piece(s). Moreover, the proposed method is very advantageous as the contours/edges of the textures features may be used as fiducial to the laser (or even fiducial mark(s) may be integrated in the texture features).

Throughout the present text, when a range is indicated, the extremities are included. In addition, all the integral and subdomain values in the numerical range are expressly included as if explicitly written.

Figure 2:
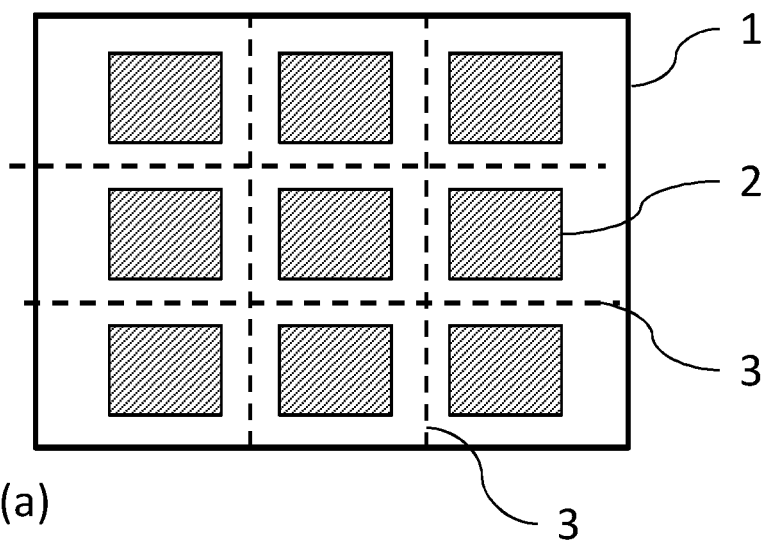
Figure 2:
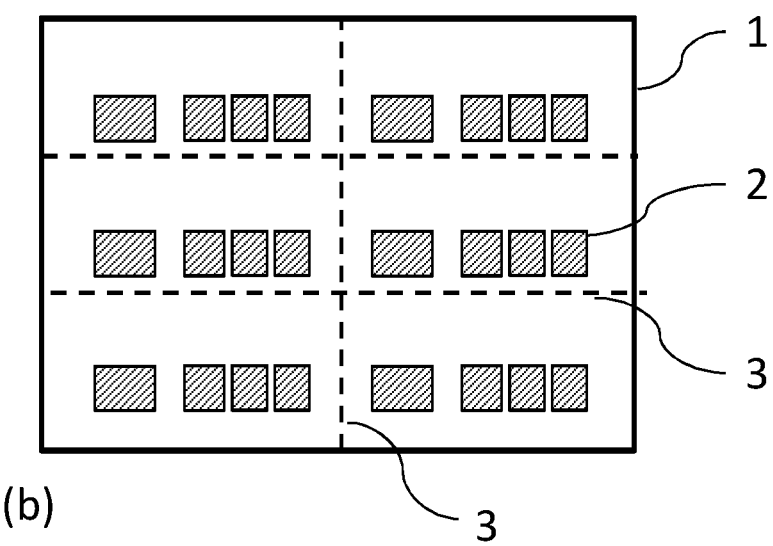
Figure 2:
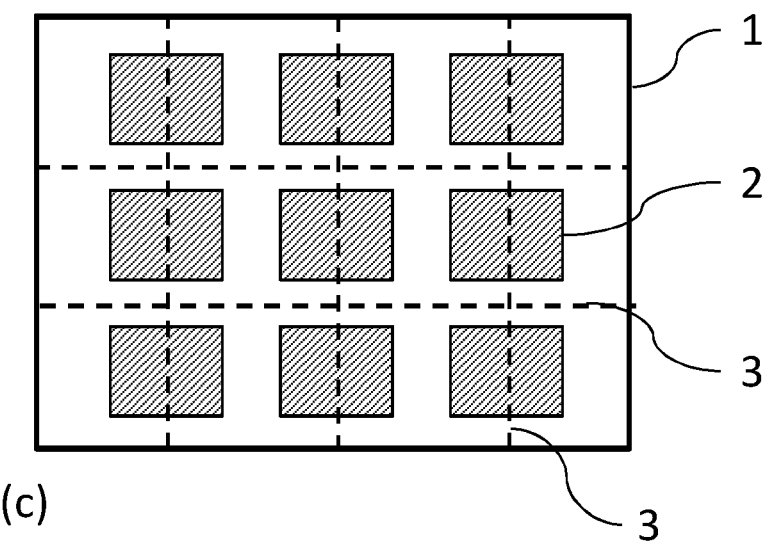

Other features and advantages of the invention will be made clearer from reading the following description of preferred embodiments and FIGS. 1 and 2), given by way of simple illustrative and non-restrictive examples:

FIG. 1 is a diagram schematically showing a flow of a method according to the present invention, and FIG. 2 schematically illustrates some configurations of partial textures and separating lines.

According to the invention, the mother glass substrate and the glass article are partially textured.

By "partially textured" in the invention, it is meant that the glass has at least one zone on its surface with a different roughness compared to the rest of said surface. Generally, the glass roughness may be evaluated through the arithmetic amplitude value, Ra. According to the invention, a zone 1 with an increased roughness compared to a zone 2 means Ra1−Ra2≥25 nm (preferably, ≥30 nm or even ≥50 nm— more preferably, ≥75 nm or even ≥100 nm), Ra1 being the arithmetic amplitude value of zone 1 and Ra2 being the arithmetic amplitude value of zone 2.

For avoidance of any doubt, according to the invention, the term "partially textured" glass substrate or glass article encompasses embodiments wherein the substrate/article show zones of different roughness (i.e., on its entire area).

According to the invention, the partial texture may be present on the first main surface or on the second main surface or on both surfaces.

According to the invention, the texture from the partial texture can be created by any known methods like removal of material from the smooth glass surface by a chemical-etching (i.e., using HF and/o fluoride compounds) or by sandblasting. Chemical etching is preferred as it allows reaching roughness and in consequence, optical properties and aesthetic appropriate for the targeted applications.

According to the invention, the partial texture can be created by any known methods that allows to selectively texture a glass surface and thereby creating textured zone(s). For example, if one considers creating the texture according to the invention by chemical etching, one may use a known method using a protective mask, which is resistant to the chemical etching treatment, making it possible to expose, to the etching treatment, only certain parts/zones of the surface of the glass, and which is then subsequently removed. The etched texture zones consequently obtained on the glass surface corresponds to the negative of the mask applied beforehand.

In the invention, and as illustrated in FIG. 2, the partial texture on the mother glass substrate (1) may be advantageously in the form of repeated patterns, each individual pattern (2) corresponding to the partial texture which will be on the glass articles once separated from the mother glass substrate. The pattern (2) on the mother glass substrate may be repeated periodically in one direction (see FIG. 2(b)) or in both directions of its surface (see FIG. 2(a)).

Each individual pattern (2) may be either:
composed of one textured zone (and thereby one non-textured or less-textured zone)—FIG. 2(a),(c); or
composed of several textured zones—FIG. 2(b).

In the invention, the separating line(s) (3) allow(s) to obtain each individual pattern (2) from the mother glass substrate (1) on the final glass articles, the number of which corresponding to the number of times the pattern is repeated on the mother glass substrate.

In another embodiment, after step b) of irradiating and before step c) of separating, the mother glass substrate is chemically strengthened. This embodiment is advantageous as it allows reinforcing the glass article(s) at their main surfaces but also at their edges. The glass article is therefore more resistant to scratches and mechanical stress/load. According to this embodiment, after the mother glass substrate is chemically strengthened: (i) the level of potassium at the first and second main surfaces of the glass article(s) is higher than the level of potassium at the edges of the glass article(s), and (ii) the level of potassium at the edges of the glass article(s) is higher than the level of potassium in the bulk of the glass article. As the level of potassium at the end faces of the glass article(s) is increased during the chemical strengthening, they are more resistant to external load stress.

The conditions of the chemical strengthening are not particularly limited in the invention. Chemical strengthening may be carried out, for example, by dipping the mother glass substrate in molten salt at 380° C. to 500° C. for 1 minute to 72 hours. As the molten salt, nitrate may be used. For example, when replacing the lithium ions contained in the glass substrate with a larger alkali metal ion, a molten salt containing at least one of sodium nitrate, potassium nitrate, rubidium nitrate, and cesium nitrate may be used. Further, in the case of replacing the sodium ions contained in the glass substrate with a larger alkali metal ion, a molten salt containing at least one of potassium nitrate, rubidium nitrate, and cesium nitrate may be used. Furthermore, when replacing the potassium ion contained in the glass substrate with a larger alkali metal ion, a molten salt containing at least one of rubidium nitrate and cesium nitrate may be used. In addition, one or more kinds of salts such as potassium carbonate may be further added to the molten salt. In this case, a low density layer having a thickness of 10 nm to 1 μm can be formed on the surface of the mother glass substrate.

By subjecting the mother glass substrate on which the at least one separating line defining contour lines of the at least one glass article to a chemical strengthening treatment, a compression stress layer can be formed at the first main surface and the second main surface of the glass substrate and at edges of the glass article(s). The thickness of the compressive stress layer corresponds to the penetration depth of alkali metal ions for substitution. For example, in the case of replacing sodium ions with potassium ions using potassium nitrate, the thickness of the compressive stress layer can be 5 μm to 50 μm for soda-lime glass, and the thickness of the compression stress layer for aluminosilicate glass is 10 μm to 100 μm. In the case of aluminosilicate glass, the penetration depth of alkali metal ions is preferably 10 μm or more, more preferably 20 μm or more.

According to an embodiment, advantageously, the method may further comprise a step of cold bending after step c) of separating. The cold bending is particularly appreciated for bending glass articles for interior and exterior glazing part for automotive such as glass console, dashboard, trim element for door, pillars, windshields, side windows, back windows, sun roofs, separation walls, . . . .

According to the present invention, at step b), the mother glass substrate is irradiated with a laser to form the at least one separating line.

According to an embodiment of the present invention, the separating line extends in a depth direction from the main surface to the opposite main surface.

Preferably, the glass substrate is irradiated with a laser to form the at least one separating line as a "spot cutting line" defined by the line of plurality of voids formed by the laser on at least the first main surface of the glass substrate.

It is therefore understood that the depth of the voids will depend on the glass thickness. More preferably, the depth of the voids is equal to the thickness of mother glass substrate.

Here, the "separating line" means a linear or curved region formed by arranging a line of plurality of voids in a predetermined arrangement. Preferably, the depth of the line of plurality of voids corresponds to the thickness of the mother glass substrate, in order to easily and properly separate the at least one glass article from the glass substrate.

Depending on the thickness of the glass substrate and/or the shape and or the size of the glass article, the required depth of voids may be obtained by submitting the first main surface of the glass substrate to a laser or by submitting the first and the second main surfaces of the glass substrate to a laser or by submitting the first main surface of the glass substrate to a multiple set of laser beams, in a successive way.

The predetermined arrangement of the "separating line" is for example a plurality of surface voids arranged in a fixed direction (X direction) on the first main surface of the glass substrate, thereby forming an in-plane void region.

Each surface void corresponds to the irradiation position of the laser on the at least first main surface and has a diameter of, for example, 1 μm to 5 μm. However, the diameter of the void varies depending on the laser irradiation condition, the type of the glass substrate . . . .

The center-to-center distance between adjacent surface voids is determined based on the composition and thickness of the glass substrate, laser processing condition, the shape and/or the size of the glass article . . . . For example, the center-to-center distance between adjacent surface voids may be in the range of 2 μm to 10 μm. It should be noted that the center-to-center distance between the surface voids does not have to be equal at all positions, and may be different depending on places. the voids may be arranged at irregular intervals.

On the other hand, as described above, the line of plurality of voids (spot cutting line) may be formed by arranging one or more voids in the glass substrate from the first main surface toward the second main surface.

The shape, size, and pitch of the voids are not particularly limited. For example, the void may have a shape such as a circle, an ellipse, a rectangle, a triangle, or the like when viewed from the Y direction. Further, the maximum dimension of the void, viewed from the Y direction is, for example, in the range of 0.1 μm to 1000 μm.

According to one embodiment of the present invention, the voids constituting at least one separating line are arranged along the thickness direction (Z direction) of the mother glass substrate. Preferably, each void of the separating line extends in the Z direction. However, each void constituting at least one separating line may be arranged from the first main surface to the second main surface of the glass substrate inclined with respect to the Z direction. The at least one separating line constituting the separating line may or may not have a void (second surface void) opened to the second main surface which is opposite to the first main surface of the glass substrate.

Thus, as described above, the separating line is not formed as a continuous "line", but a virtual void region formed when each surface void is joined. It should be noted that it represents a linear region.

Furthermore, the separating line may be composed of a plurality of single parallel lines arranged in an extremely close proximity to form one aggregate of a plurality of parallel lines.

According to an advantageous embodiment of the present invention, the laser is a filament cutting laser or a green laser. Preferably, the laser is a filament laser, because the speed of the method could then be increased.

The laser suitable for the method according to the present invention, is for example, a short pulse laser. It is preferable that such a short pulse laser beam is a burst pulse to from efficiently voids constituting the at least one separating line. Further, the average output at the irradiation time of such a short pulse laser is, for example, 30 W or more. When this average output of the short pulse laser is less than 10 W, sufficient voids may not be formed in some cases. As an example of laser light of a burst pulse, one internal void row is formed by a burst laser with a pulse number of 3 to 10, the laser output is about 90% of the rated (50 W), the burst frequency is about 60 kHz, the burst time The width is from 20 picoseconds to 165 nanoseconds. As a time width of the burst, a preferable range is from 10 nanoseconds to 100 nanoseconds.

If a plurality of separating lines are formed on the first main surface, the separating lines may be made on one step or more than one step. The separating line(s) is(are) defined in function of the desired size of the glass article(s) (i.e. final product(s)). From the larger sized mother glass substrate, the contours of the glass article(s) are defined by the separating lines. Thus, after step b), glass articles are separated from the large sized mother glass substrate according to the separating/contour lines and collected.

According to one embodiment of the present invention, the separating line(s) and more particularly the plurality of adjacent voids is made from the upper surface of the glass substrate. By the term "the upper surface of the glass substrate"; it is understood the surface of the glass surface which is not in direct contact with the support upon which the glass substrate is disposed to implement separating line(s).

According to one embodiment of the present invention, the separating line(s) and more particularly the plurality of juxtaposed voids is made from the upper surface (first main surface) of the glass substrate and the lower surface (second main surface) of the glass substrate. According to this embodiment, the first main surface of the glass substrate may be first irradiated with the laser and then the second main surface is irradiated. Still according to this embodiment, alternatively, the first and the second main surfaces may be irradiated simultaneously.

According to one embodiment of the present invention, the separating line(s) defining contour lines for dividing at least one glass article from the mother glass substrate may be internal and/or external. By internal separating line, it is meant a separating line which at least one extremity meets one edge of the mother glass sheet. By internal separating line, it is meant a separating line which does not meet the edges of the mother glass sheet.

The required depth of the voids constituting the separating line may be obtained by repeating the laser operation through the thickness of the glass substrate.

At step c) of proposed method of the invention, the glass articles are separated from the mother glass substrate. Different methods are possible to carry out the separation. A solution might be to initiate a crack with a mechanical equipment (diamond tool, cutting wheel, . . . ) in a controlled position so that the crack will propagate along the initial separating lines. In addition, creating additional voids in the vicinity of the initial separating lines will create a controlled crack propagation along the initial separating lines. Indeed, these first methods are using the inner tension inside the core of the glass panels, created by the chemical tempering process. Therefore, a first crack initiation in a appropriated position will induce the separation of the glass articles from the initial glass panel. A destruction of the initial glass panel, out of the final glass articles, give also the possibility to obtain the final glass articles without affecting its quality. Another technique to separate the glass articles from the mother glass substrate is to promote the cleaving of the separation lines by inducing a thermal shock: whether heating up with a CO2 laser spot, a flame or IR heaters, or cooling down with compressed air, liquid nitrogen or other coolants solution. Also, pouring an acid solution (etching solution) onto the plurality of juxtaposed voids will induce the cleaving of the glass articles.

According to the invention, the glass composition of the mother glass substrate is not particularly limited as long as its composition is suitable for chemical strengthening. The glass substrate may be, for example, soda-lime glass, aluminosilicate glass, alkali aluminosilicate glass . . . . The glass substrate according to the invention may be a glass substrate obtained by a floating process, a drawing process, a rolling process or any other process known to manufacture a glass sheet starting from a molten glass composition. According to a preferential embodiment according to the invention, the glass substrate is a float glass substrate. The term "float glass substrate" is understood to mean a glass substrate formed by the float glass process, which consists in pouring the molten glass onto a bath of molten tin, under reducing conditions.

The mother glass substrate according to the invention is made of glass whose matrix composition is not particularly limited and may thus belongs to different categories. The glass may be a soda-lime-silicate glass, an aluminosilicate glass, an alkali-free glass, a boro-silicate glass, etc. Preferably, the glass substrate of the invention is made of a soda-lime glass or an alumino-silicate glass.

According to an embodiment of the invention, the glass substrate has a composition comprising, in a content expressed in percentages of the total weight of the glass:

| | |
|---|---|
| SiO₂ | 55-85% |
| Al₂O₃ | 0-30% |
| B₂O₃ | 0-20% |
| Na₂O | 0-25% |
| CaO | 0-20% |
| MgO | 0-15% |
| K₂O | 0-20% |
| BaO | 0-20%. |

In a preferred embodiment, the glass substrate has a composition comprising, in a content expressed in percentages of the total weight of the glass:

| | |
|---|---|
| SiO₂ | 55-78% |
| Al₂O₃ | 0-18% |
| B₂O₃ | 0-18% |
| Na₂O | 5-20% |
| CaO | 0-10% |
| MgO | 0-12% |
| K₂O | 0-12% |
| BaO | 0-5%. |

In a more preferred embodiment, the glass substrate has a composition comprising, in a content expressed in percentages of the total weight of the glass:

| | |
|---|---|
| SiO₂ | 60-78% |
| Al₂O₃ | 0-8% |
| B₂O₃ | 0-4% |
| CaO | 0-10% |
| MgO | 0-12% |
| Na₂O | 5-20% |
| K₂O | 0-12% |
| BaO | 0-5%. |

In the most preferred embodiment, the glass substrate has a composition comprising, in a content expressed in percentages of the total weight of the glass:
$60 \leq SiO_2 \leq 78\%$
$5 \leq Na_2O \leq 20\%$
$0.9 < K_2O \leq 12\%$
$4.9 \leq Al_2O_3 \leq 8\%$
$0.4 < CaO < 2\%$
$4 < MgO \leq 12\%$.

The mother glass substrate according to the invention can have a thickness between 0.03 and 19 mm. Advantageously, the mother glass substrate according to the invention may have a thickness between 0.03 mm to 6 mm. Preferably, for reasons of weight and to be able to cold bend easily the glass article if required, the thickness of the mother glass substrate may be from 0.1 to 2.2 mm.

According to the invention, the mother glass substrate may be flat or alternatively, it may be totally or partially curved, i.e. to correctly fit with the particular design of the final glass article(s) and/or a support if the glass article(s) has(ve) to be cold bent.

The present invention also relates to a glass article obtained by the method described above.

The present invention also relates to a glass article which is partially textured, characterized in that it has at least one edge showing:
 angles formed with first and second main surfaces each equal to 90°±7°;
 a surface roughness defined by Ra of from 0.1 to 1 microns, measured at a location along a line at sheet thickness divided by two (or sheet thickness/2).

Finally, the present invention also relates to a glass article which is partially textured and which shows:
 (i) a level of potassium at the first and second main surfaces of the glass article higher than the level of potassium at the edges of said glass article, and
 (ii) a level of potassium at the edges of the glass article higher than the level of potassium in the bulk of the glass article.

As the level of potassium at the edges of the article is increased, said edges are more mechanically resistant.

The glass article according to the present invention is particularly suitable as a vehicle's interior glazing such as a console, a dashboard, car external windows, a glass trim element for which more and more complexed shaped are requested by car's manufacturers. In particular, the glass article is very suitable as a vehicle's glass console, a dashboard or a trim element.

The invention claimed is:

1. A method of manufacturing a partially textured glass article comprising:
   a) providing a partially textured mother glass substrate having a first main surface and a second main surface which are opposed to each other wherein the partially textured mother glass substrate has a plurality of spaced apart partially textured zones on the first or second main surface with each zone corresponding to a partial texture for a corresponding glass article,
   b) irradiating the first main surface of the mother glass substrate with a laser to form, on the first main surface, at least one separating line defining contour lines and extending in a depth direction from the first main surface to the second main surface, for dividing the partially textured glass article from the glass substrate, the partially textured glass article being a size smaller than a size of the mother glass substrate, and
   c) separating the partially textured glass article from the mother glass substrate according to the separating line, wherein texturing of the partially textured mother glass substrate is created by removal of material from the first or second main surface of the mother glass substrate.

2. The method according to claim 1, wherein the separating line comprises a plurality of adjacent voids forming a spot-cutting line.

3. The method according to claim 1, wherein between b) irradiating and c) separating, the mother glass substrate is chemically strengthened.

4. The method according to claim 1, wherein the partially textured glass article is partially textured and has at least one edge showing:

angles formed with the first and second main surfaces each equal to 90°±7°; and
   a surface roughness defined by Ra of from 0.1 to 1 microns, measured at a location along a line at sheet thickness/2.

5. The method according to claim 4, wherein the partially textured glass article is a vehicle's interior glazing.

6. The method according to claim 4, wherein the partially textured glass article is a vehicle's glass console, a dashboard or a trim element.

7. The method according to claim 1, wherein:
   a level of potassium at the first and second main surfaces of the glass article is higher than a level of potassium at edges of the glass article, and
   a level of potassium at the edges of the glass article is higher than a level of potassium in a bulk of the glass article.

8. The method according to claim 4, wherein the partially textured glass article has a thickness in a range of 0.03 and 19 mm.

9. The method according to claim 8, wherein the thickness of the partially textured glass article has a range of 0.03 mm to 6 mm.

10. The method according to claim 8, wherein the thickness of the partially textured glass article has a range of 0.1 to 2.2 mm.

11. The method according to claim 1, further comprising irradiating the second main surface of the partially textured glass substrate.

12. The method according to claim 1, wherein texturing of the partially textured mother glass substrate is created by chemical etching or sand blasting.

13. The method according to claim 1, wherein the textured zones have a roughness Ra1 and a non-textured zone on a same surface as the textured zones has a roughness Ra2 such that $Ra1-Ra2 \geq 25$ nm.

* * * * *